United States Patent
Martinsson et al.

(10) Patent No.: US 9,133,600 B2
(45) Date of Patent: Sep. 15, 2015

(54) METHOD FOR SELECTING AN ATTACK POSE FOR A WORKING MACHINE HAVING A BUCKET

(75) Inventors: Torbjörn Martinsson, Valla (SE); Martin Magnusson, Orebro (SE)

(73) Assignee: Volvo Construction Equipment AB, Eskilstuna (SE)

( * ) Notice: Subject to any disclaimer, the term of this patent is extended or adjusted under 35 U.S.C. 154(b) by 58 days.

(21) Appl. No.: 14/346,076

(22) PCT Filed: Sep. 23, 2011

(86) PCT No.: PCT/SE2011/000165
§ 371 (c)(1),
(2), (4) Date: Jun. 10, 2014

(87) PCT Pub. No.: WO2013/043087
PCT Pub. Date: Mar. 28, 2013

(65) Prior Publication Data
US 2015/0046044 A1   Feb. 12, 2015

(51) Int. Cl.
G06F 7/70   (2006.01)
E02F 3/43   (2006.01)
E02F 9/20   (2006.01)
E02F 3/30   (2006.01)
B25J 9/16   (2006.01)
G05D 1/02   (2006.01)
E02F 9/26   (2006.01)

(52) U.S. Cl.
CPC ............ *E02F 3/431* (2013.01); *E02F 3/434* (2013.01); *E02F 3/439* (2013.01); *E02F 9/2029* (2013.01); *E02F 9/262* (2013.01); *B25J 9/1607* (2013.01); *E02F 3/304* (2013.01); *E02F 3/437* (2013.01); *E02F 9/264* (2013.01); *G05D 1/0274* (2013.01)

(58) Field of Classification Search
CPC ......... E02F 9/262; E02F 9/2029; E02F 3/439; E02F 3/434; E02F 9/264; E02F 3/304; E02F 3/437; E02F 3/341; G05D 1/0274; B24J 9/1607
See application file for complete search history.

(56) References Cited

U.S. PATENT DOCUMENTS

| | | |
|---|---|---|
| 5,924,493 A | 7/1999 | Hartman et al. |
| 6,108,949 A | 8/2000 | Singh et al. |
| 6,167,336 A | 12/2000 | Singh et al. |

(Continued)

FOREIGN PATENT DOCUMENTS

| | | |
|---|---|---|
| WO | 2006029938 A1 | 3/2006 |
| WO | 2007149145 A1 | 12/2007 |

OTHER PUBLICATIONS

International Search Report (Jun. 12, 2012) for corresponding International Application PCT/SE2011/000165.

(Continued)

*Primary Examiner* — Behrang Badii
(74) *Attorney, Agent, or Firm* — WRB-IP LLP

(57) ABSTRACT

A method for selecting an attack pose, when loading piled materials, for a working machine having a bucket includes acquiring three dimensional pile data, generating a set of attack poses, generating a bucket trajectory through the pile for each attack pose, for each attack pose in the set of attack poses, calculating a measure of a convexity of the pile surface for an area of the pile surface delimited by a bucket width and a vertical projection of the bucket trajectory, and selecting an attack pose based on the measure of convexity.

15 Claims, 10 Drawing Sheets

(56) References Cited

U.S. PATENT DOCUMENTS

| | | | |
|---|---|---|---|
| 6,247,538 | B1 | 6/2001 | Takeda et al. |
| 7,457,698 | B2 * | 11/2008 | Danko .......................... 701/50 |
| 7,832,126 | B2 * | 11/2010 | Koellner et al. ............... 37/348 |
| 2004/0158355 | A1 | 8/2004 | Holmqvist et al. |
| 2004/0267404 | A1 * | 12/2004 | Danko ........................ 700/245 |
| 2006/0090378 | A1 * | 5/2006 | Furem ............................ 37/443 |
| 2007/0299590 | A1 * | 12/2007 | Shull et al. .................... 701/50 |
| 2008/0282583 | A1 * | 11/2008 | Koellner et al. ............... 37/348 |

OTHER PUBLICATIONS

Singh S; Simmons R; "Task Planning for Robotic Excavation" Intelligent Robots and Systems, 1992. Proceedings of the IEEE/RSJ International Conference on Intelligent Robots and Systems. Raleigh, NC., Jul. 7-10, 1992; [Proceedings of the IEEE/RSJ International Conference New York, IEEE, US, val 2, Jul. 7, 1992, pp. 1284-1291, XP010223183, ISBN 978-0-7803-0738-4; ISBN 0-7803-0738-0; whole document.

Noriho Koyachl; Shigeo Sarata: "Unmanned loading operation by autonomous wheel loader" ICCAS-SICE, 2009, IEEE, Piscataway, NJ, USA, Aug. 18, 2009, 2221-2225, XP031567959, ISBN 978-4-907764-34-0; ISBN 4-907764-34-0; whole document.

Shigeru Sarata et al: "Planning of scooping position and approach path for loading operation by wheel loader", 22nd International Symposium on Automation and Robotics in Construction ISARC Sep. 11-14, 2005, Sep. 14, 2005, p. 1, XP055202319, Retrieved from the Internet: URL:http://www.iaarc.org/publications/full text/isarc2005-16sarata.pdf.

Supplementary European Search Report (Jul. 20, 2015) for corresponding European App. EP 11 87 2555.

* cited by examiner

METHOD FOR SELECTING AN ATTACK POSE FOR A WORKING MACHINE HAVING A BUCKET

BACKGROUND AND SUMMARY

The present invention relates to a method for selecting an attack pose for a working machine having a bucket, such as a wheel loader. In particular the present invention relates to a method which evaluates a set of possible attack poses for assessing a loading condition of relevance for the potential filling rate of the bucket. The invention also relates to a method of loading a bucket by use of said method for selecting an attack pose and a corresponding bucket trajectory.

Automatic handling of heterogeneous piled materials is a core component in many construction and mining applications. A typical work cycle of an autonomous wheel loader working in these applications consists of or comprises three repeated tasks: loading, hauling, and dumping. Hauling between the load and dump points can be handled in a number of ways, whether by GPS-waypoint following, or some more flexible approach from the rich literature on mobile-robot navigation. Dumping is relatively straightforward and can, in principle, be performed with preprogrammed motions. Efficient loading is a harder problem than the dumping sequence, and no practical solution for fully autonomous vehicles exists today. For economical and environmental reasons, it is important that the bucket is filled maximally in each load cycle and that the mechanical stress on the machine is minimized. When an automated wheel loader approaches a gravel pile, then, it should evaluate potential attack poses; i.e., positions and orientations at which it is efficient to approach the pile. Also, when used as an operator support function, the same functionality is important to evaluate any potential attack pose and inform the user about the quality of choice.

An example of a prior art method for determining an excavation strategy is presented in U.S. Pat. No. 6,167,336. According to the method a concavity measure is determined by assessing a quota of the volume inside a bucket divided by the total bucket volume. The measure is determined based on the volume in the bucket when the front corners of the bucket touches the pile. Hence a very limited information of the pile is considered for the determination of this concavity measure. Since filling of the bucket is determined by the shape of the pile along the whole trajectory of the bucket through the pile, it is apparent that the measure cannot be used to separate between poor and good trajectories in a real pile. This approach is further quite sensitive to the point sampling of the pile, especially at places that are only mildly convex. Because only a small part of the bucket model enters the pile when the front corners touch the edge, it can easily happen that a high value is obtained even when the bucket enters the pile perpendicularly.

Another example of a method for assessing the quality of an attack pose is provided in "Planning of scooping position and approach path for loading operation by wheel loader", Shigeru Sarata, et. al., 22nd International Symposium on Automation and Robotics in Construction ISARC 2005—Sep. 11-14, 2005, Ferrara (Italy).

In this paper the shape of the pile at a trajectory of the bucket through the pile is considered. The method uses an approach where a value related to the torque around the center of the bucket is calculated and used as a parameter for determining the quality of an attack pose. It is apparent that important information is lost by the proposed method, since the load distribution cannot be derived from the studied torque measure.

It is desirable to provide an improved method for selecting an attack pose which enables provision of high fill rates of the bucket.

A method according to an aspect of the present invention includes the steps of: acquiring three dimensional pile data, generating a set of attack poses; and generating a bucket trajectory through the pile for each attack pose. The acquiring of the pile data can be performed by a use of a 3D range sensor.

The set of generated attack poses and corresponding bucket trajectories are possible attacks. Among the set of attack poses and bucket trajectories one will be selected at each loading operation. After a loading operation is performed, new pile data will be retrieved, a new set of attack poses and bucket trajectories will be determined for enabling selection of an actual bucket trajectory and a corresponding attack pose to be executed.

The method further includes the steps of for each attack pose in said set of attack poses, calculating a measure of a convexity of the pile surface for an area of the pile delimited by a bucked width and a vertical projection of the bucket trajectory, and selecting an attack pose based on said measure of convexity.

An attack pose consists of or comprises an angle of attack of the bucket and a position for the attack. The angle of attack is an angle of the bucket with reference to a negative surface normal, which is a normal pointing inwardly into the pile, hence in the same direction as the attack of the bucket into the pile at the position of attack. The position of the attack is considered to be the point of the pile at which the middle of the bucket in a lateral direction makes contact with the pile.

By considering the convexity of the area of the pile for an area at the surface of the pile delimited by the bucked width and vertical projection of the trajectory, a measure which has a substantial impact on the filling rate of the bucket is evaluated. It is apparent that cross-sections of the pile transverse to the bucket trajectory having a convex shape will assist in providing a bucket load having a convex shape. This is different from the known prior art which do not consider the shape of the pile along the bucket trajectory and therefore cannot be used to determine the convexity of the pile in the relevant area.

In an embodiment of the invention the convexity measure is determined by determining sweep volumes of segments of said bucket. A sweep volume is a volume of the pile within a sweep area at the surface of the pile defined by a width of a segment of the bucket and length extension of the bucket trajectory, that is the vertical projection of the bucket trajectory. The bucket trajectory is the trajectory which the bucket is intended to propagate through the pile in the event the bucket trajectory is selected for execution. The method further comprises the step of calculating said measure of convexity based on said sweep volumes of segments of said bucket.

Specifically the segments may include a central segment, a right wing segment and a left wing segment. The measure of convexity may be calculated based on a comparison between the sweep volumes of the left wing segment, the right wing segment and the central segment.

In an embodiment the width of the bucket is separated into three segments of equal width. Here the measure of convexity may be calculated as $CC=(Vc/\max(Vr, Vl))-1$.

Optionally, a side load measure may additionally be determined for each attack pose. The attack pose may be selected in dependence of the measure of convexity and the side load measure. The side load measure may be based on a comparison between the volumes of the left and right wing segments. The side load measure may be calculated as $CS=(abs(Vr-Vl))/(Vr+Vl)$.

The pile data may be retrieved by retrieving 3D point cloud from a sensor and separating said 3D point cloud into ground data and said three dimensional pile data.

Optionally a ground plane may be fitted to the ground data.

Optionally potential attack poses may be selected among scan points in the vicinity of and preferably at the border of the pile, wherein orientations of the attack pose is selected within a range of less than 20° deviation from a border normal.

Optionally, the sweep volumes are calculated from the ground plane to a pile surface.

Optionally, the sweep volumes are calculated from the trajectory to a pile surface.

In an alternative embodiment, a surface may be fitted to three dimensional pile data within an area defined by a width of the bucket and said bucket trajectory, and the measure of a convexity may be calculated from said surface.

Such an alternative embodiment may include the process steps of:

fitting a quadratic polynomial: $zr=axr2+bxryr+cyr2+dxr+eyr$ to said three dimensional pile data within the area defined by a width of the bucket and said bucket trajectory; and determining said measure of convexity from said factor a.

The method may optionally include the steps of:

fitting a plane to the three dimensional pile data within an area defined by a width of the bucket and said bucket trajectory;

constructing a rotated principal frame from a ground frame being rotated around the surface normal of said plane;

mapping the three dimensional pile data into the rotated principal frame.

Optionally, a measure of side load may be determined from said factor d.

The invention also relates to a method for loading a bucket by use of a construction machine having a bucket, a sensor system for detecting three dimensional pile data, and an automated steering system for enabling propagation of the bucket along a bucket trajectory in a pile, said method including selection of an attack pose and a corresponding bucket trajectory by use of a method for selecting an attack pose as described above and control of the construction machine to position the bucket at said selected attack pose and to run said bucket along said selected bucket trajectory in order to optimize the filling of the bucket. This method is suitable for automatic handling of heterogeneous piled materials by an autonomous wheel loader

BRIEF DESCRIPTION OF DRAWINGS

The invention will be described in further detail below, with reference to appended drawings where.

DETAILED DESCRIPTION

Figure 1:
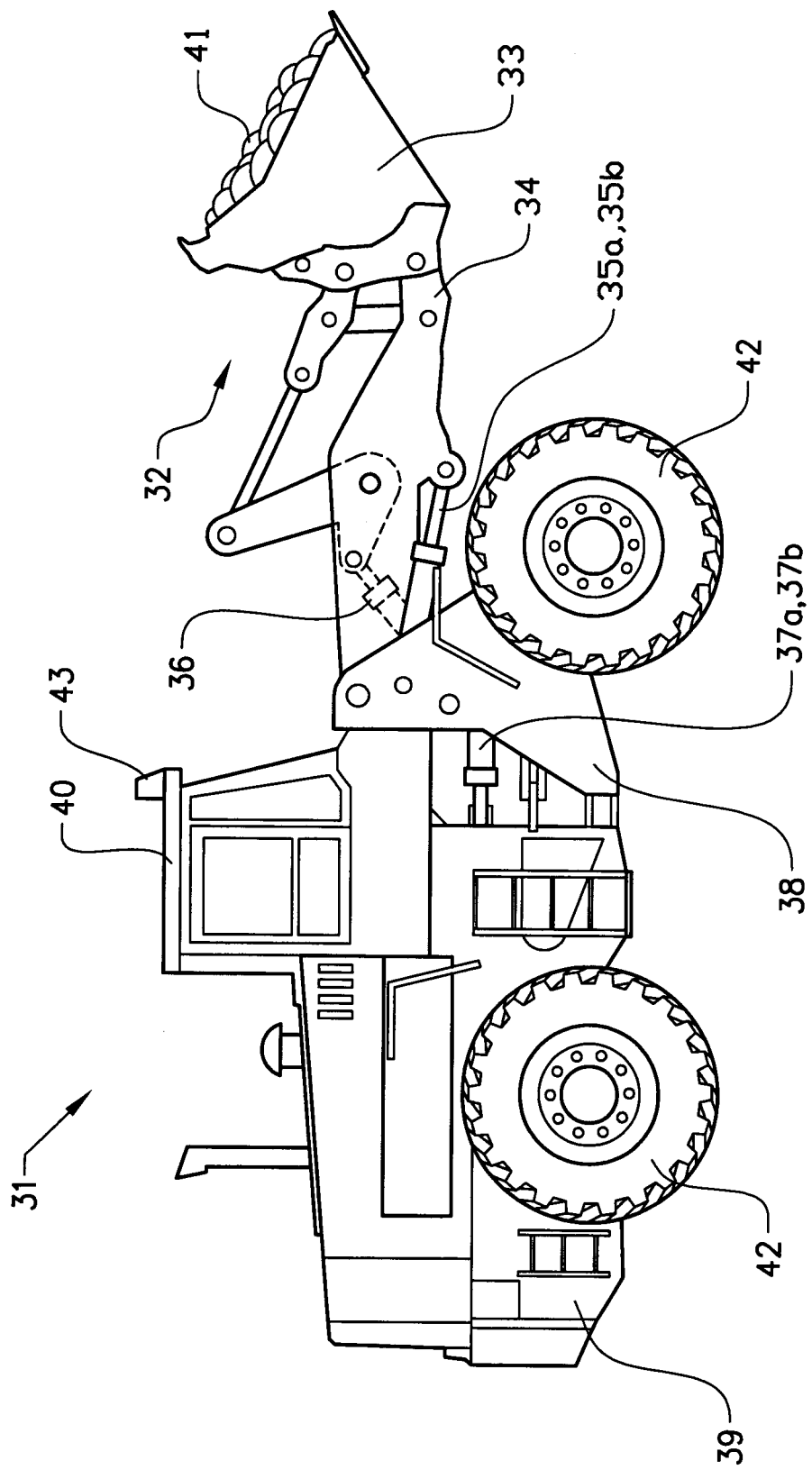
FIG. 1 Shows a wheel loader at which the invention may be used.

FIG. 1 shows a working machine 1 in the form of a wheel loader. The wheel loader 1 is to be considered as an example of a working machine having a hydraulic system to control the steering of the machine as well as the position of the bucket.

The wheel loader has a forward machine part 38 and a rear machine part 39. Each of these machine parts comprises a frame and wheels 42 arranged on an axle. The rear machine part 39 comprises a cab 40 for an operator of the wheel loader 31. The machine parts 38, 39 are connected to each other in such a way that they can pivot relative to each other about a vertical axis by means of two hydraulic cylinders (steering cylinders) 37a, 37b which are arranged between the machine parts 38, 39 and attached thereto. The hydraulic cylinders 37a, 37b are thus arranged one on each side of a centre line extending in the longitudinal direction of the working machine 31 in order to turn or steer the wheel loader by means of the hydraulic cylinders. In other words, the wheel loader 13 is a so called frame-steered working machine.

The wheel loader comprises a load arm assembly 32 for handling different loads, such as objects or material. The load arm assembly 32 comprises a lift arm unit 34 and an implement 33 in the shape of a bucket which is mounted on the lift arm unit. In the illustrated example the bucket 33 is filled with material 41. A first end of the load arm unit 34 is pivotally connected to the forward machine part 38 in order to achieve a lift motion of the bucket 33. The bucket 33 is pivotally connected to a second end of the lift arm unit 34 in order to achieve a tilt motion of the bucket. The lift arm unit 34 can be raised and lowered relative to the forward machine part 38 of the vehicle by means of two hydraulic cylinders (lift cylinders) 35a, 35b. Each of the hydraulic cylinders is at a first end thereof coupled to the forward machine part 38 and at the second end thereof to the lift arm unit 34. The bucket 33 can be tilted relative to the lift arm unit 34 by means of a further hydraulic cylinder (tilt cylinder) 36, which at a first end thereof is coupled to the forward machine part 38 and at the second end thereof is coupled to the bucket 33 via a link arm system.

The wheel loader comprises also a drive line (not illustrated) which includes an engine, such as an internal combustion engine, torque converter, gear box etc. The engine can be arranged to supply power to the drive line for driving the wheels 42 and for driving hydraulic machines (pumps) in the hydraulic system by means of a power take off (PTO) which can be arranged at the drive line between the engine and the torque converter.

The wheel loader further comprises a sensor system for detecting three dimensional pile data, and an automated steering system for enabling propagation of the bucket along a bucket trajectory in a pile.

Figure 2:
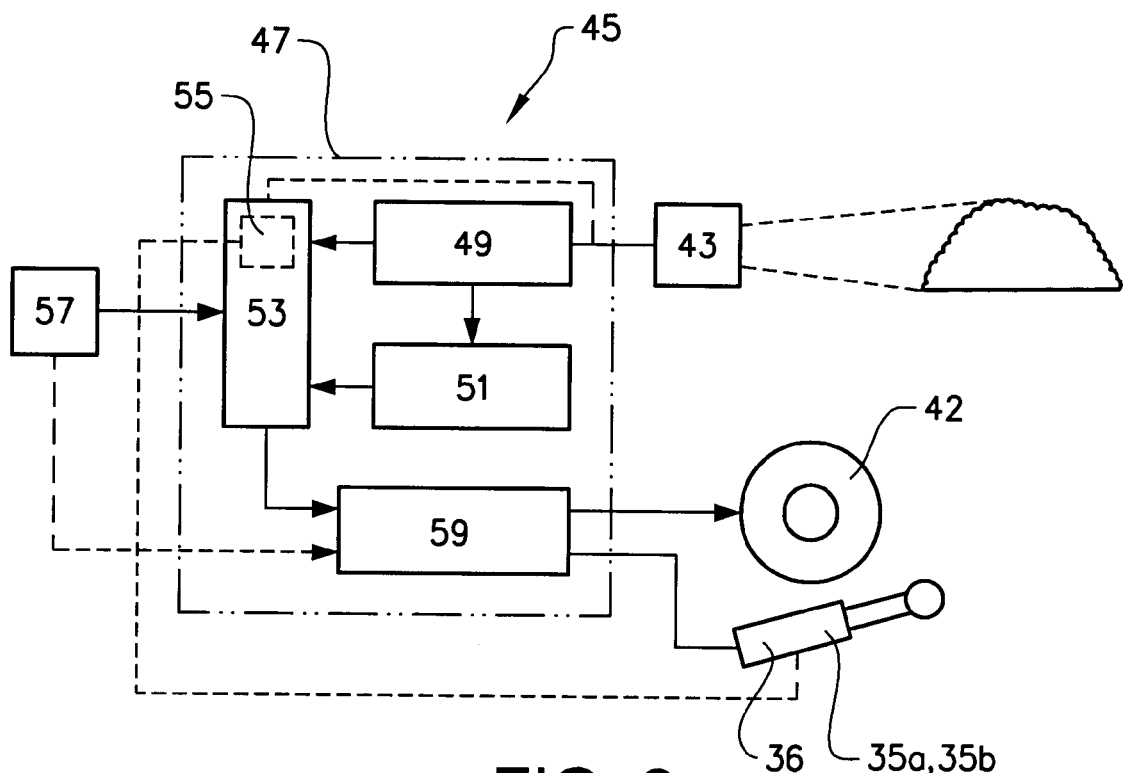
FIG. 2 Shows a system for automatic control of the movement of the working machine.

In FIG. 2 a system 45 for automatic control of the movement of the working machine is shown. The system includes the sensor system 43 which is connected to an electronic control unit 47. The electronic control unit contains a functional block 49 which acquires three dimensional pile data from the sensor 43. Further in a second control block 51 bucket trajectories and attack poses are generated. From the attack poses and trajectories as well as the three dimensional pile data a an actual attack pose and trajectory is selected in a third functional block 53. The third functional block 53 may be in communication with a machine coordinate system determinator 55, determining the position of the working machine, in particular the position of the bucket relatively to the pile. The machine coordinate system determinator 55 may include a gps unit 57. Further, the machine coordinate system determinator 57 may retrieve information from the sensor system 43 to determine the relative position of the working machine and the pile as well as information from the actuating cylinders 35*a*, 35*b* and 36 which determines the position of the bucket relative to the working machine. In a fourth functional block the movement of the bucket will be controlled to follow the selected bucket trajectory 59 by control of the wheels 42 of the wheel loader as well as the actuating cylinders 35*a*, 35*b* and 36 which determines the position of the bucket relative to the working machine.

Figure 3:
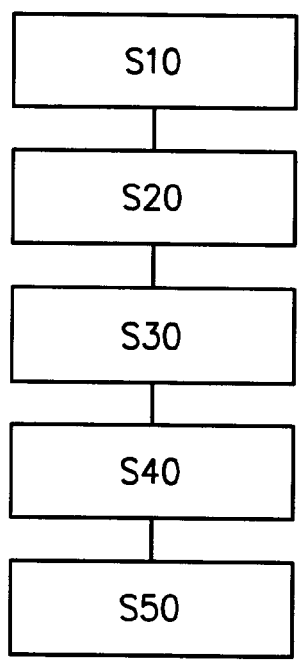
FIG. 3 Shows a flow chart for a method according to the invention

In FIG. 3 a flow chart for a method according to the invention is shown. In a method for selecting an attack pose according to the invention the following steps are included.

In a first method step S10 three dimensional pile data is acquired by a three dimensional scanner.

In a second method step S20 a set of attack poses is generated.

In a third method step S30 a bucket trajectory through said pile for each attack pose is generated.

In a fourth method step S40 a measure of a convexity of the pile surface for an area of the pile surface delimited by a bucket width and a vertical projection of the bucket trajectory is calculated for each attack pose in said set of attack poses.

An in a fifth method step S50 an attack pose based on said measure of convexity is selected. In one embodiment the fourth method step S40 includes the steps of determining sweep volumes of segments of said bucket, a sweep volume being a volume of the pile within a sweep area defined by a width of a segment and length extension of the trajectory; and calculating said measure of convexity based on said sweep volumes of segments of said bucket.

In another embodiment the fourth method step S40 includes the steps of fitting a plane to the three dimensional pile data within an area defined by a width of the bucket and said bucket trajectory; constructing a rotated principal frame from a ground frame being rotated around the surface normal of said plane; mapping the three dimensional pile data into the rotated principal frame; fitting a rotated principle quadratic polynomial:

$$zr = axr2 + bxryr + cyr2 + dxr + eyr$$

to said three dimensional pile data within the area defined by a width of the bucket and said bucket trajectory; and determining said measure of convexity from said factor a.

Optionally the method may include the step of separating point cloud data from the scanner 43 into pile data and ground data.

Further optional method steps include clustering and triangulating of pile points.

Figure 4:
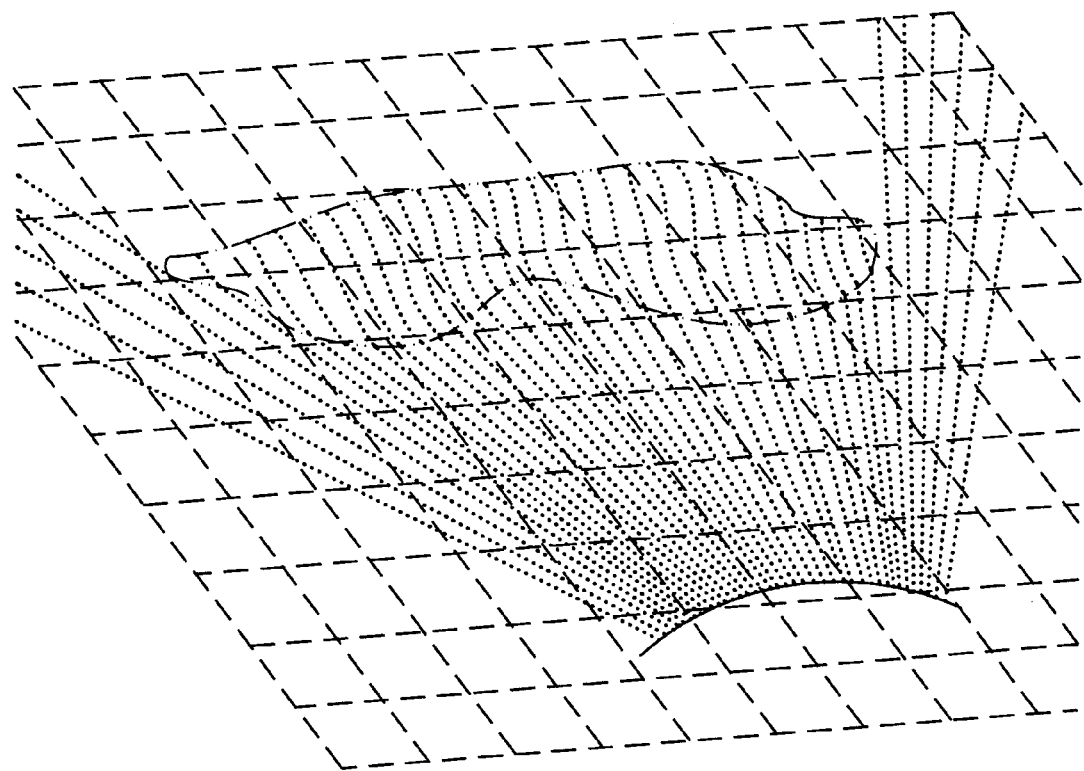
FIG. 4 Shows an example point cloud, generated by an actuated laser range finder, showing a gravel pile.

Below as exemplifying detailed method is described:

We here describe a flowchart for the operations that may be done when executing presented method. The process consists of or comprises:

Acquiring 3D data
Classify 3D data into ground and pile points
Clustering pile points
Triangulate pile points
Chose attack point for digging
Calculate reference plane, ground plane or trajectory plane, for attack point
Calculate volumes
Evaluate attack point according to convexity and side load
Method step S10
Acquiring 3D data Initially, the system acquires 3D data of the shape of its surroundings using a 3D range sensor. Example sensor modalities are laser range finders (for example, Velodyne HDL-64E or a SICK LMS291 mounted on an actuator to get 3D coverage), stereo vision (for example, Point Grey Bumblebee XB3), and structured-light sensors (for example, Microsoft Kinect). The output of the 3D range sensor is a cloud point; that is, a set of measured points from the surrounding surfaces, each with a 3D (x, y, z) position. See an example point cloud in FIG. 4.

Optional Method Step
Classifying Pile Points Vs. Ground and Clutter

Given a 3D point cloud, the system needs a method to reliably detect which parts of the current view that belong to a pile. One strategy for segmenting out the part of the pointcloud data that correspond to piles is outlined below.

1. or each point p, find all surrounding points qi within a local neighbourhood radius r. Here r may be suitably selected to 0.5 m. In order to enable fast nearest-neighbour search, the points should be stored in an efficient data structure, such as a kd-tree.

2. Compute the mean vector m and covariance matrix C of the position of the n points within r.

$$m = \frac{1}{n} \sum_{i=1}^{n} q_i$$

$$C = \frac{1}{n-1} \sum_{i=1}^{n} (q_i - m)(q_i - m)^T$$

3. Compute the eigenvalues ($\lambda 1$, $\lambda 2$, $\lambda 3$) and the corresponding eigenvectors (e1, e2, e3) of C (for example, using Jacobi's method), asserting that the eigenvalues and eigenvectors are sorted so that $\lambda 1 \leq 0.2 \leq 3$.

4. The sorted eigenvalues $\lambda 1 \leq \lambda 2 \leq \lambda 3$ describe the shape of the local surface shape around point p. Points that are planar enough (with $\lambda 1 \ll \lambda 2 \leq \lambda 3$; i.e. with a distribution that is not linear or spherical) and have the right inclination (such that the angle between the corresponding eigenvector e1 and the horizontal plane is within two angle thresholds $\alpha 1$ and $\alpha 2$) are classified as "pile". Planar points with an angle below a1 are classified as "ground".

5. Nearby points with the same class are then clustered and segmented (using radially-bounded nearest-neighbour clustering [1]).

6. Pile clusters whose bounding boxes are above a certain threshold size are used for the succeeding pile analysis.

Figure 5:
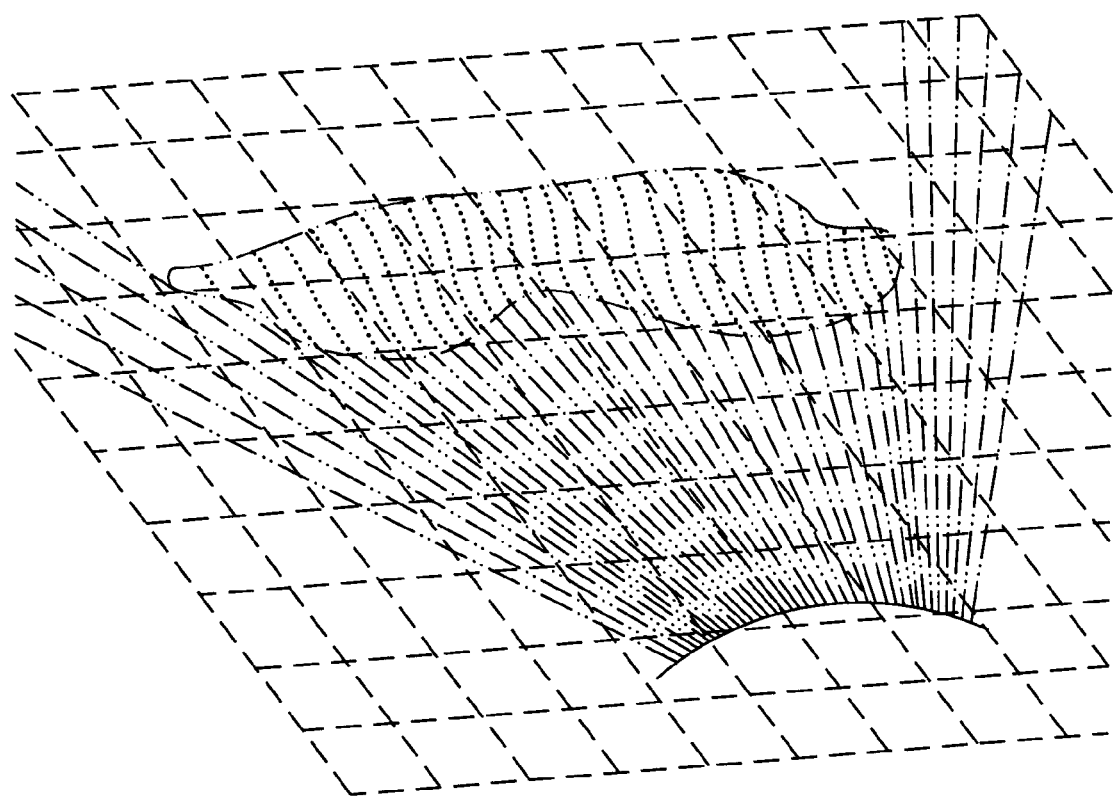
FIG. 5 Shows the same point cloud as in FIG. 1, classified according to local surface shape.

An example point cloud after classification is shown in FIG. 5.

Optional Method Step

Triangulation

Figure 6:
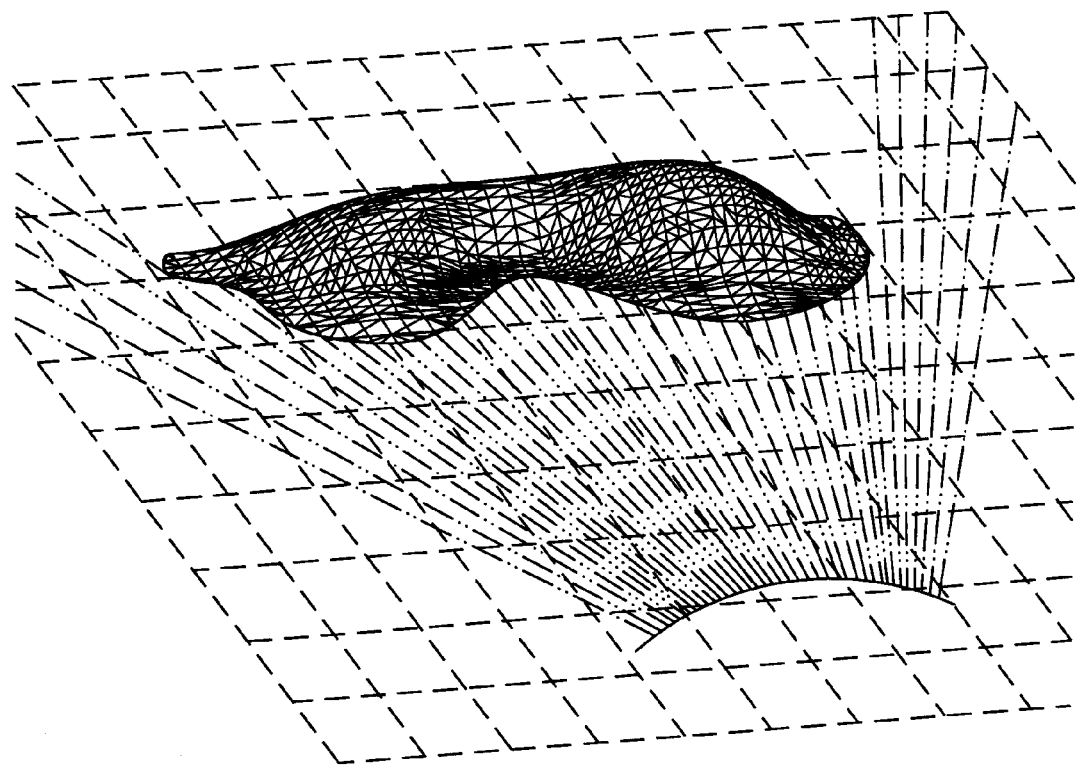
FIG. 6 Shows the same point cloud as in FIGS. 1 and 2, where the nearest pile surface cluster has been triangulated (notice the edges of the triangle faces connecting the pile points).

In order to estimate the volume of the pile, or segments of the pile, the points within a cluster that has been classified as "pile" are triangulated, forming a 2D manifold surface. A triangulated surface, corresponding to a pile, is shown in FIG. 6.

In the case of 3D data from a laser range finder, the 3D points are ordered in a grid pattern, which makes triangulation easier. In ideal conditions (when there is no missing data), it is as simple as connecting adjacent points.

In the case of sparser, unstructured, 3D data (such as what is produced by stereo-vision systems, or when multiple 3D scans from different viewpoints have been registered to a common coordinate frame, or when there are missing points caused by poor reflectivity of the pile material), more elaborate triangulation algorithms need to be applied. For example, Delauney triangulation, marching cubes, or ball pivoting.

Method Step S20

Attack-Pose Selection

Given a cluster of points, sampled from a pile surface, the next step is to select a pose (that is, a position and an orientation) at which to attack the pile.

Operators typically enter the pile with the bucket as low as possible, touching the ground. One way of selecting potential attack poses is to select the position of a scan point that is close to the ground plane, choosing an orientation along, or close to, the surface normal at that point. The surface normal can be calculated in a similar fashion as what is done in the pile classification step for all points (see items 1-4 in the numbered list above). The covariance of the positions of points within a local neighbourhood is computed, and the normal is given by the eigenvector of the covariance matrix that has the smallest eigenvalue.

Optional Method Step

Ground-Plane Estimation

In order to compute the volume of the pile, the ground surface under the pile must be estimated. This can be done by fitting a plane to the points classified as "ground". In order to avoid that outlier points skew the plane estimation, the ground plane should be estimated using a robust fitting method, such as MLESAC [2].

A random subset of the "ground" points are selected as hypothetical inliers, and a plane model is fitted to only those points. All other points are then tested against the fitted model, and points that agree with the model are included as hypothetical inliers. These two steps are iterated, and the result is a refined plane model without influence of potential outliers.

The scan is then rotated and translated so that the ground plane coincides with the plane z=0 in the local coordinate frame.

Method Step S30

Trajectory Generation

A trajectory for bucket fill is depending on a lot of prerequisites, and we discuss here some of the most important ones. We presume that the digging is to fill the bucket totally, that ending height of bucket is not required in a certain value, and we also assume that it's not important to translate through as much as possible of the pile surface—like when one wants to scrape of material. For this digging the trajectory is normally planned in four steps as below:

1. Run into pile with bucket flat on ground. Continue a typical distance, different for different machines, material in pile, and different shape and size of bucket. A typical length for a 20 ton wheel loader with a bucket of 3.2 m2 is 0.5 m. This is to get the bucket well into the pile before starting to raise it.

2. Next step is to establish good pressure on front wheels. Therefore a typical next step in the trajectory is to raise the bucket still in horizontal position—that is, only use the lift actuator. The length of this part differs between different machines which have different linkage systems and hydraulic pressure. Stall torque is the upper limit of how much one can lift. A linkage system with high lift torque will continue longer than a system designed with less lift torque. The absolute trajectory of the bucket tip in correlation to the pile is also depending on the slope of the pile. A steep slope requires a steeper trajectory, and a more flat pile requires a more flat trajectory. Typically one uses a fixed slope of the trajectory for piles with mean value slopes higher than some 30 degrees, as is common when digging repeatedly from piles. In the same way as above, a usual length of this part of the trajectory is around 1 m into the pile and bucket tip at 0.5 m in height.

3. Thereafter the ordinary trajectory is to raise the bucket in parallel with the surface of the slope, which means that when digging into a steep pile the trajectory is equally steep. When digging into an uneven pile this is accomplished with a mean value trajectory.

4. The final step in the trajectory is when the bucket has translated a sufficient volume of the pile. Then operator tilts the bucket out of the pile and the digging is finished. The major translation of bucket is vertically, and horizontal movement depends on machine and material. Normally the vertical translation is much bigger than the horizontal.

The overall volume that bucket envelop should of course be greater than the bucket's volume with some excess, we here assume a trajectory that gives roughly the same volume as bucket volume.

One obvious way to estimate a trajectory is to assume the above mentioned default values, and based on an estimate of pile slope in chosen digging point, calculate a trajectory height in the pile with exit coordinates.

Then this trajectory will serve as the reference plane for volume estimations when doing the evaluation of a chosen digging point Method Step S40

Volume Estimation

Given a ground plane, or a reference plane as for instance a trajectory for bucket translation in pile, the volume Vf below a triangle face f with edge points i=[i1,i2,i3], j=[j1,j2,j3], k=[k1,k2,k3], is given by $$Vf=(i3+j3+k3)/3*|(i1(j2-k2)+j1(k2-i2)+k1(i2-j2))/2|$$

assuming the scan is aligned so that the ground plane is at z=0.

The total volume of the pile, where triangulated points exists, can be estimated by summing over all these triangle faces.

And, given an attack point, in the same way a volume of a segment of the pile above a reference plane and delimited by bucket width or parts of bucket width may also be calculated.

Convexity and Side Load Estimates

We describe two methods of estimating the local pile convexity and sideload, given an attack pose.

Method Step S40

Three-Part Bucket

Given the triangulated pile surface and a generated trajectory starting at some attack pose, the convexity of the pile segment that is affected by a loading operation can be estimated by comparing the partial volumes traced by three segments of the bucket.

Let Vc be the volume inside the centre third of the bucket and Vl and Vr the left and right thirds. The convexity can then be modelled as $$C_C = \frac{V_c}{\max(V_l, V_r)} - 1$$

Convex areas have CC>0 and concave areas have CC<0. The side load is measured as $$CS = |Vl - Vr|/(Vl + Vr)$$

Trajectories resulting in a skewed load will have larger CS values, and good trajectories will have CS values close to zero.

Alternative Method Step S40

Quadric Fitting

Instead of estimating convexity and side load from the volumes below a triangulated surface, these quantities can also be estimated by fitting a quadric surface to the points within the local neighborhood of a potential attack pose. The local neighborhood is taken to be all the points that fall into the surface of the volume traced by the bucket trajectory.

For a point p on a smooth surface, the principal directions are the directions in the tangent plane with minimum and maximum curvatures. The principal coordinate frame $Xp = [xp\ yp\ zp]^T$ is an orthonormal frame that has xp and yp aligned with the principal directions, and zp aligned with the surface normal n. In the principal frame, the principal quadric is a second-order description of the surface.

---

Algorithm 1 Estimate local curvature at a surface point p.

---

Let $P = (p^i)_{i=1}^n$ be a set of points in the neighbourhood of p, expressed in the global coordinate frame.
1) Fit a plane to the points in X using total least squares. Use the plane's normal as an estimate of the surface normal n at p.
2) Construct a rotated principal frame $X_r$. (7).
3) Map the points of P into $X_r$ (6):
$$p_r^i = [x_r^i\ y_r^i\ z_r^i]^T = R_r(p^i - p), \qquad (10)$$
4) Fit the rotated principal quadric
$$z_r = ax_r^2 + bx_ry_r + cy_r^2 + dx_r + ey_r \qquad (11)$$
to the mapped points.
The horizontal curvature corresponds to a. The sideload can be estimated by the horizontal slope term d.

---

A common approach for quadric fitting (adapted from McIvor and Valkenburg [3]) is listed in Algorithm 1. It makes use of a rotated principal frame Xr. For pile convexity estimation, it is mostly the horizontal curvature that is interesting. The horizontal curvature may not correspond to the principal curvature. Therefore, a rotated principal frame, defined such that one axis is aligned with the surface normal and one is parallel to the ground, should be used instead.

Consider the "world" coordinate frame $Xw = [xw\ yw\ zw]T$ with xw and yw in the ground plane, and zw pointing to the sky. The transformation for a point piw from the world coordinate frame to the rotated principal frame for point pw is $$p_r^i = R_r(p_w^i - p_w), \qquad (6)$$

The rotated principal frame can be defined using $$R_t = [r_1 r_2 r_3]^T, \qquad (7)$$

with r3=n, r2=(zw×n)/(zw×n), r1=r3×r2.

The rotated principal frame is related to the principal frame Xp by a rotation around n.

For fitting the parameters of the rotated principal quadric (step 4 of Algorithm 1), the BFGS quasi-Newton algorithm is used in our implementation.

The quantities used for evaluating attack poses are taken from (11), with convexity and sideload $$D_C = -a$$

$$D_S = |d|$$

Convex areas have DC>0 and concave areas have DC<0.

Figure 7:
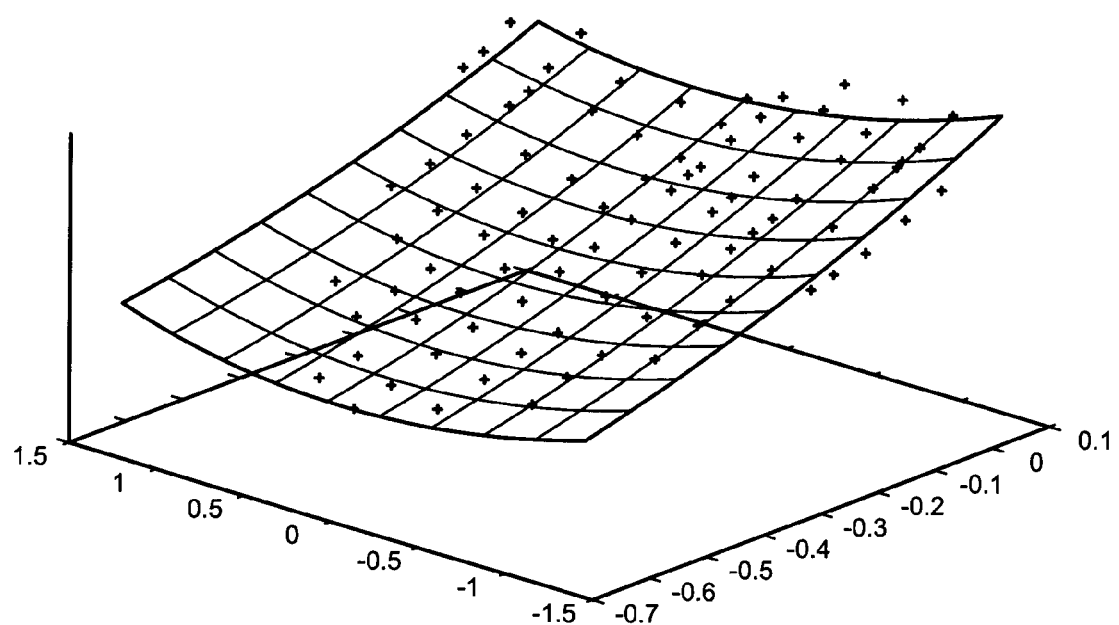
FIG. 7 Is an example of convexity estimation using quadric fitting. The surface points are marked with cross marks. In this case, a=1.0, which means that this is a highly concave surface.

See FIG. 7 for an illustration of a fitted quadric surface to a set of points.

The fitting error (that is, the mean squared distance of all points to the fitted surface) can be used as a confidence estimate of DC and DS.

If the goal of surface fitting were to produce an accurate parameterized surface description, a higher-order surface could be fitted instead of a second-order surface. However, as our goal is to estimate the overall convexity of a surface patch, a second-order parameterization is sufficient. There are also numerical issues when fitting a high-order polynomial to a surface. A better approach to modelling the surface analytically would be, for example, a Gaussian process.

Method Step S50

According to the method an attack pose with a corresponding bucket trajectory is selected in dependence of the calculated measure of convexity, alternatively a weighed quality value may be used. Given a measure of the estimated convexity and side load resulting from a loading operation at a given attack pose, the quality of that attack pose can be measured by a weighted combination of the convexity and sideload, where the weighing can be set and evaluated in real testing of digging against recorded data.

Figure 8A:
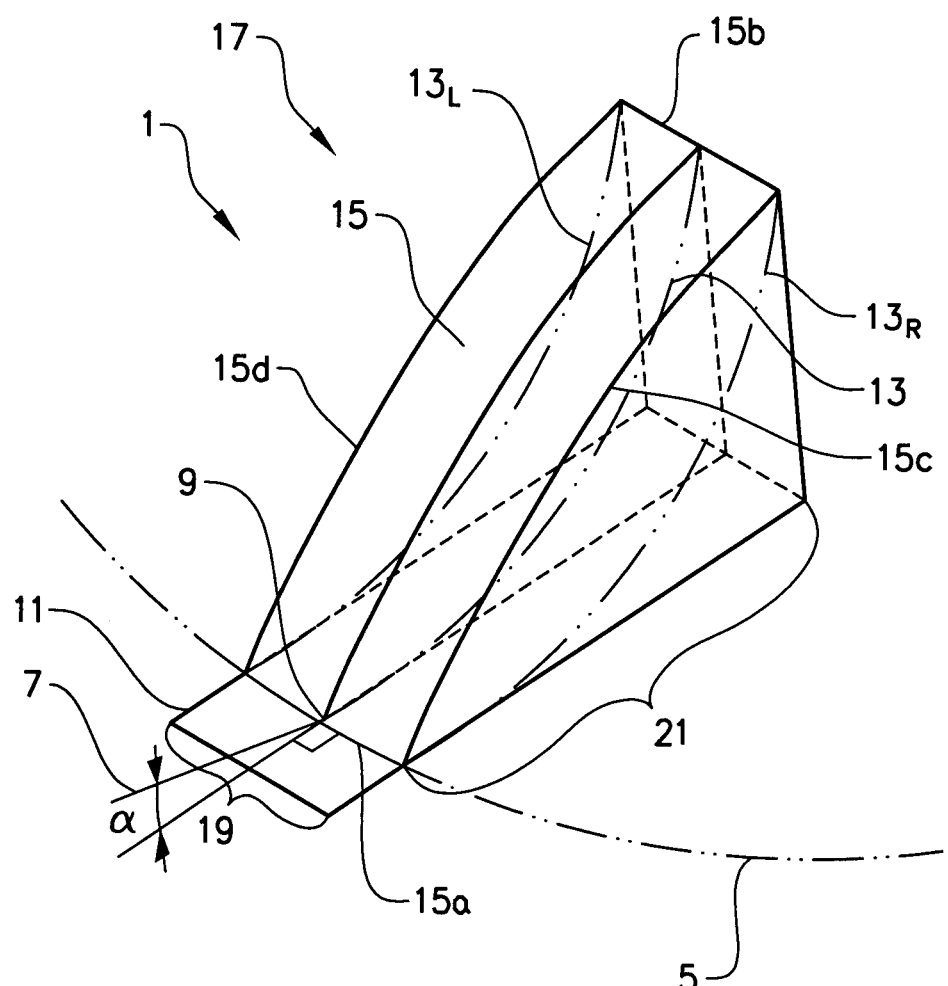
FIG. 8a Shows a bucket trajectory through a pile and indicates an area of the pile surface delimited by a bucket width and a vertical projection of the bucket trajectory.

FIG. 8a shows a pile 1 positioned on a ground plane 3. The pile is delimited by a pile border 5 which separates the pile 1 from the ground plane 3. An attack pose is indicated by the vector 7 having an attack position 9 and an angle of attack α. The angle of attack α may preferably be selected in a range having a deviation of less than 10° from the negative surface normal. The position of a bucket 11 is indicated. The attack position 9 is for practical reasons set to be in the middle of the bucket in a lateral direction. In the method a set of attack poses in generated. The set of attack poses may contain a range of possible attack positions and angles of attack. The attack position is selected along the pile border, or if desired at a height distance from the border. If the attack is selected at a certain height from the ground plane, the angle of attack is determined with respect to the surface normal of the pile for a plane at the selected height. A bucket trajectory 13 being the intended trajectory of the bucket through the pile in the event the attack pose is selected is indicated with a dashed line. The dashed lines 13L and 13R show the trajectories of the left and sight front corner of the bucket. A measure convexity of the pile surface is to be calculated for an area 15 of the pile surface 17 delimited by a bucket width 19 and a vertical projection 21 of the bucket trajectory 13. The area is on the surface of the pile is delimited by the front end 15a, the back end 15b, and the left and right sides 15c,15d respectively being the surface projection of an area constituted by the width of the bucket and the vertical projection of the bucket trajectory. With surface projection is here intended the projection of the area constituted by the width of the bucket and the vertical projection of the bucket trajectory on the surface area of the pile.

Figure 8B:
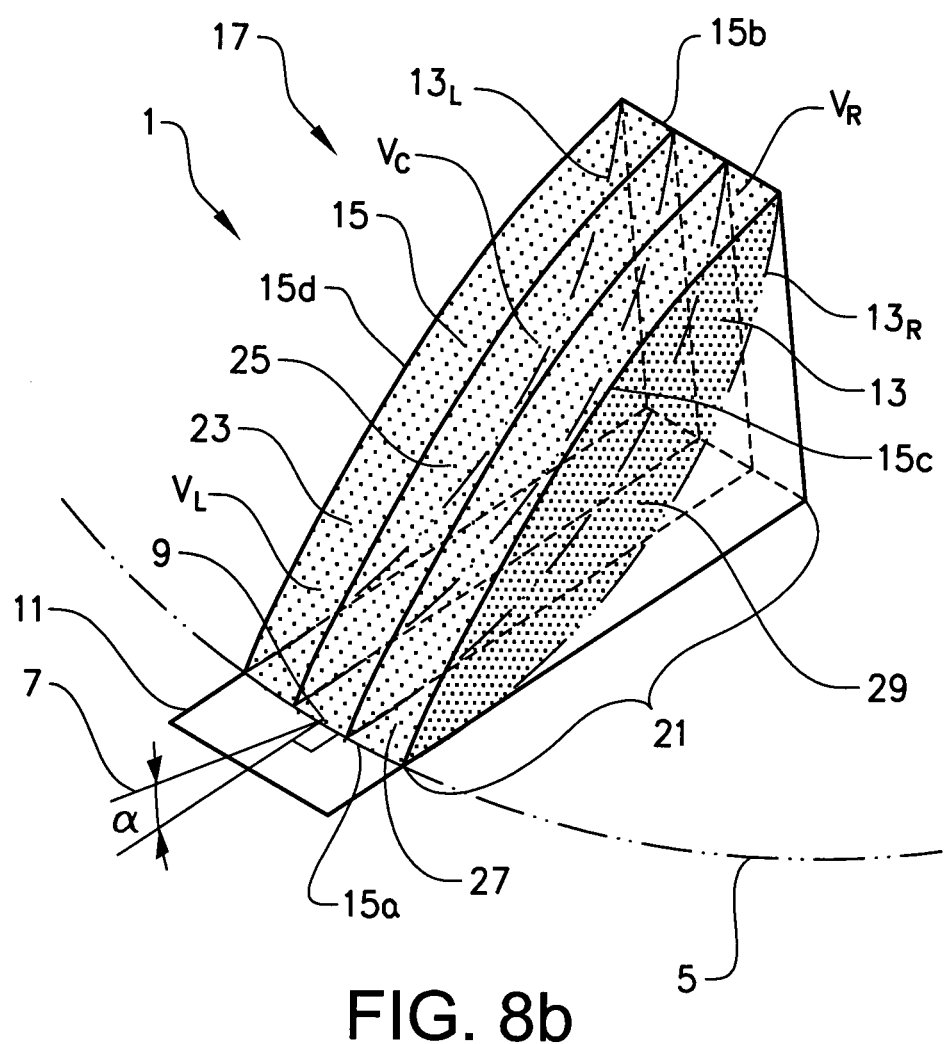
FIG. 8b Shows sweep volumes of segments of said bucket for a first embodiment.
Figure 8C:
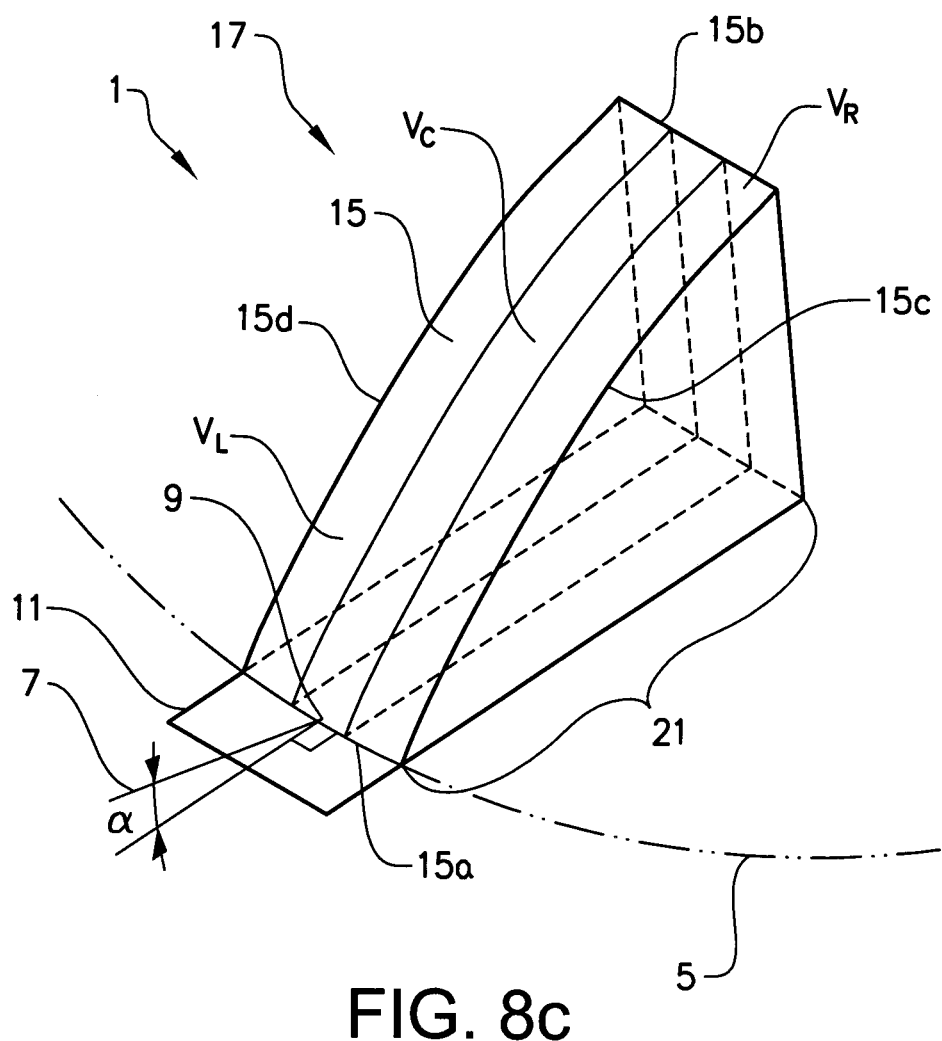
FIG. 8c Shows sweep volumes of segments of said bucket for a second embodiment.

The convexity of the pile surface area 15 is determined in one embodiment by determining sweep volumes of segments of said bucket, a sweep volume being a volume of the pile within a sweep area defined by a width of a segment and length extension of the trajectory. In FIG. 8b the sweep volume of three segments, a left segment, a central segment and a right segment, 23, 25 and 27 are shown. In FIG. 7b the volumes VL, VC and VR are the volumes between a surface 29 defined by the width of the bucket and the bucket trajectory and the area 15 of the pile surface.

In an alternative embodiment as indicated in FIG. 5c the volumes VL, VC and VR are the volumes between the ground plane and the area 15 of the pile surface.

Figure 9:
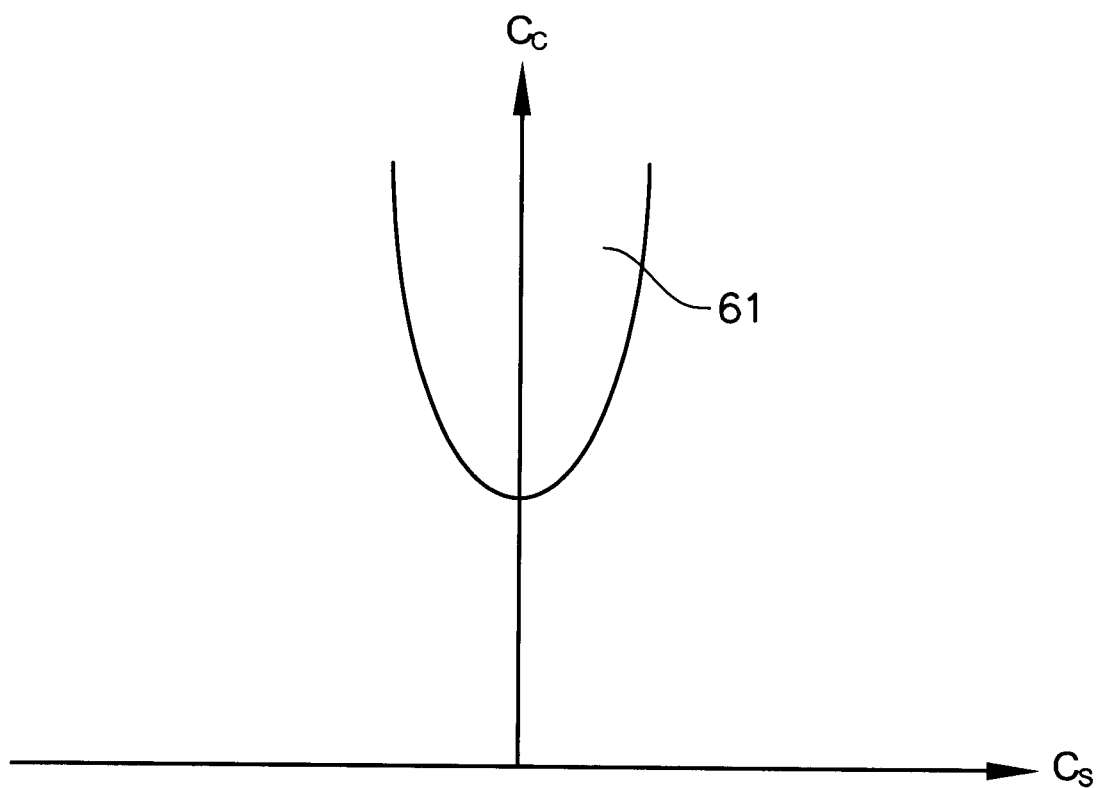
FIG. 9 Shows a two dimensional diagram having a measure of the side load CS on the horizontal axle and the measure of concavity CC on the vertical axle.

FIG. 9 shows a two dimensional diagram having a measure of the side load CS on the horizontal axle and the measure of concavity CC on the vertical axle. An area of interest which is close to balanced load between the left and right side and which has a relatively high concavity is indicated. Attack poses with this area may be selected at attack poses which provides a good loading condition for the bucket.

REFERENCES

[1] K. Klasing, D. Wollherr, and M. Buss. A clustering method for efficient segmentation of 3D laser data. In ICRA, pages 4043-4048, Pasadena, USA, May 2008.
[2] P. H. S. Torr and A. Zisserman. MLESAC: a new robust estimator with application to estimating image geometry. Computer Vision and Image Understanding, 78(1):138-156, April 2000.
[3] A. M. McIvor and R. J. Valkenburg. A comparison of local surface geometry estimation methods. Machine Vision and Applications, 10:17-26, 1997.

The invention claimed is:

1. Method for selecting an attack pose, when loading piled materials, for a working machine having a bucket, the method comprising:
   acquiring three dimensional pile data (P);
   generating a set of attack poses;
   generating a bucket trajectory through the pile for each attack pose;
   for each attack pose in the set of attack poses, calculating a measure of a convexity (CC) of the pile surface for an area of the pile surface delimited by a bucket width and a vertical projection of the bucket trajectory; and
   selecting an attack pose based on the measure of convexity (CC).

2. Method according to claim 1, further comprising
   determining sweep volumes (VL, VC, VR) of segments of the bucket, a sweep volume being a volume of the pile within a sweep area defined by a width of a segment and length extension of the trajectory; and
   calculating the measure of convexity (CC) based on the sweep volumes (VL, VC, VR) of segments of the bucket.

3. Method according to claim 1, further comprising additionally determining a side load measure (CL) for each attack pose, and selecting an attack pose based on the side load measure (CS) and the measure of convexity (CC).

4. Method according to claim 1, wherein the segments including a central segment, a right wing segment and a left wing segment, further comprising
   calculating the measure of convexity (CC) based on a comparison between the sweep volumes of the left wing segment (VL), the right wing segment (VR) and the central segment (VC).

5. Method according to claim 3, further comprising calculating the measure of convexity (CC) based on a comparison between the sweep volumes of the left wing segment (VL), the right wine segment (VR) and the central segment (VC), the side load measure (CS) is based on a comparison between the volumes of the left and right wing segments (VL, VR).

6. Method according to claim 1, wherein the width of the bucket is separated into three segments of equal width and the measure of convexity (CC) is calculated as CC=(Vc/max(Vr, Vl))−1 and the side load measure is calculated as CS=(abs(Vr−Vl))/(Vr+Vl).

7. Method according to claim 1, further comprising retrieving 3D point cloud from a sensor and separating the 3D point cloud into ground data and the three dimensional pile data.

8. Method according to claim 7, further comprising
   fitting a ground plane to the ground data.

9. Method according to claim 1, further comprising selecting potential attack poses among scan points in the vicinity of and preferably at the border of the pile, wherein orientations of the attack pose is selected within a range of less than 20° deviation from a border normal.

10. Method according to claim 1, further comprising that the sweep volumes are calculated from a ground plane to a pile surface and from the bucket trajectory to a pile surface.

11. Method according to claim 1, further comprising
    fitting a surface to three dimensional pile data within an area at the surface of the pile defined by a width of the bucket and the bucket trajectory, and
    calculating the measure of a convexity (CC) from the surface.

12. Method according to claim 11, wherein the method includes the following steps:
    fitting a quadratic polynomial:

$$zr = axr2 + bxryr + cyr2 + dxr + eyr$$

to the three dimensional pile data within the area defined by a width of the bucket and the bucket trajectory; and
    determining the measure of convexity (CC) from the factor a in the quadratic polynomial.

13. Method according to claim 12, further including the following steps:
    fitting a plane to the three dimensional pile data within an area defined by a width of the bucket and the bucket trajectory,
    constructing a rotated principal frame from a ground frame being rotated around the surface normal of the plane; and
    mapping the three dimensional pile data into the rotated principal frame.

14. Method according to claim 13, further comprising
    determining a measure of side load from the factor d.

15. Method for loading a bucket by use of a working machine having a bucket, a sensor system for detecting three dimensional pile data, and an automated steering system (45) for enabling propagation of the bucket along a bucket trajectory in a pile, the method including selection of an attack pose and a corresponding bucket trajectory by use of a method according to claim 1, control of the working machine to position the bucket at the selected attack pose and to run the bucket along the selected bucket trajectory in order to optimize the filling of the bucket.

* * * * *